United States Patent
Cheng

[19]

[11] Patent Number: 6,110,124
[45] Date of Patent: Aug. 29, 2000

[54] VOICE THERMOSCAN

[75] Inventor: Chien-Chung Cheng, Taipei, Taiwan

[73] Assignee: Draco Tech International Corp., Taipei, Taiwan

[21] Appl. No.: 09/231,543

[22] Filed: Jan. 14, 1999

[51] Int. Cl.[7] ...................................................... A61B 5/00
[52] U.S. Cl. ............................................................. 600/549
[58] Field of Search ................................... 600/549, 559, 600/587, 595

[56] References Cited

U.S. PATENT DOCUMENTS

| | | | |
|---|---|---|---|
| 5,211,479 | 5/1993 | Coffey et al. | 374/151 |
| 5,246,292 | 9/1993 | Gal et al. | 600/549 |
| 5,473,629 | 12/1995 | Muramoto | 600/549 |
| 5,873,833 | 2/1999 | Pompei | 600/549 |

*Primary Examiner*—Max Hindenburg
*Attorney, Agent, or Firm*—Pro-Techtor International Services

[57] ABSTRACT

Disclosed is a voice thermoscan having a main body in which a sensor circuit, a microprocessor, a liquid crystal display (LCD), an electronic erasable programmable read-only memory (EEPROM), and a communication interface are included. When the voice thermoscan is used to take a patient's temperature, the sensor circuit senses an infrared heat at a temperature point on the patient's eardrum and sends a corresponding signal to the microprocessor for the same to sample and digitize the signal and compare the digitized signal with corrected data stored in the EEPROM, in order to verify the temperature value of the infrared heat and output the comparison result to the LCD for display. The microprocessor can also output the value of temperature to the communication interface to indicate the value of temperature by voice or music and also voice and music. Thereby, the thermoscan can be conveniently used by all people, including the blind.

1 Claim, 3 Drawing Sheets

VOICE THERMOSCAN

BACKGROUND OF THE INVENTION

The present invention relates to improvements made to a thermoscan, and more particularly to a thermoscan that may indicate a scanned temperature value through an additional voice function thereof.

There are various types of products available in the markets for taking body temperature, such as mercurial thermometer, paper thermometer and thermoscan. The present invention relates to some improvements made to the internal structure of a conventional thermoscan.

The conventional thermoscan usually includes an electronic temperature-sensing element for sensing the temperature in a patient's acoustic meatus, a microprocessor for analog-to-digital conversion of a value of the sensed temperature, and an LCD for visually indicating the value of temperature scanned by the thermoscan. While such conventional thermoscan provides convenient observation of a scanned temperature, it has following disadvantages:

1. The blind or people having optical difficulties can not view the value of temperature displayed on the LCD; and
2. Small children are frequently scared by and dislike the conventional thermoscan that causes uncomfortable feeling when being extended into their ears.

It is therefore tried by the inventor to develop a voice thermoscan that provides not only a visual reading but also an audible voice of the scanned temperature and can therefore be conveniently used by all users, including the blind and people having optical difficulties.

SUMMARY OF THE INVENTION

A primary object of the present invention is to provide a dual-function thermoscan that indicates the value of temperature taken in a patient's acoustic meatus by both visual readings and audible voice for the benefit of the blind and people having visual difficulties.

Another object of the present invention is to provide a dual-function thermoscan that produces pleasant music through a voice system therein to attract small children and further eliminates their fear toward the thermoscan.

To achieve the above and other objects, the voice thermoscan of the present invention is included in its main body a sensor circuit, a microprocessor, a liquid crystal display (LCD), an electronic erasable programmable read-only memory (EEPROM), and a communication interface. When the voice thermoscan is used to take a patient's temperature, the sensor circuit senses an infrared heat at a temperature point on the patient's eardrum and sends a corresponding signal to the microprocessor for the same to sample and digitize the signal. The digitized signal is then compared to corrected data stored in the EEPROM and operated by the microprocessor, in order to verify the temperature value of the sensed infrared heat. The result from the comparison is then sent to the LCD for display. The microprocessor can also output the value of temperature to the communication interface which includes voice means to indicate the value of temperature by voice.

BRIEF DESCRIPTION OF THE DRAWINGS

The above and other objects of the present invention and the features and functions thereof can be best understood by referring to the following detailed description of the preferred embodiments and the accompanying drawings, wherein.

DETAILED DESCRIPTION OF THE PREFERRED EMBODIMENTS

Figure 1:
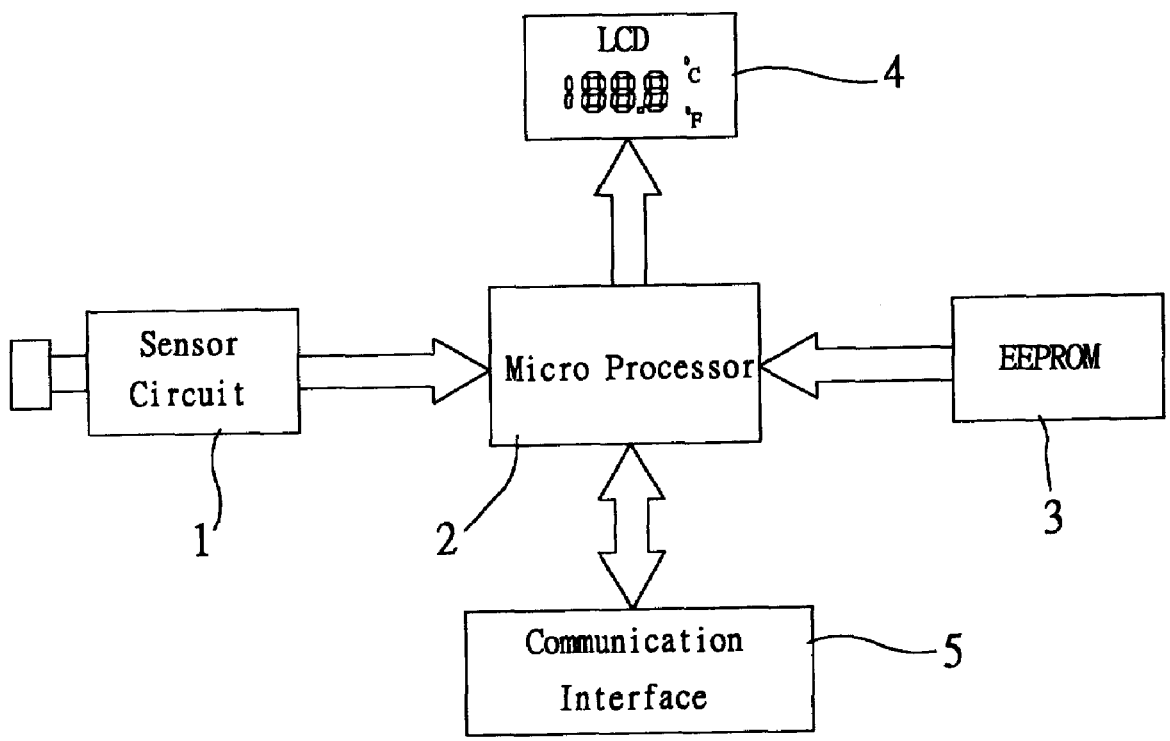
FIG. 1 is a block diagram of an internal structure of the voice thermoscan according to the present invention.

Please refer to FIG. 1 that is a block diagram of an internal structure of a voice thermoscan according to the present invention. The voice thermoscan includes a main body (not shown) in which a sensor circuit 1, a microprocessor 2, an electronic erasable programmable read-only memory (EEPROM) 3, a Liquid crystal display (LCD) 4, and a communication interface 5 are included.

The sensor circuit 1 includes a thermopile element for sensing a temperature at a patient's eardrum and sending a corresponding signal to the microprocessor 2. The microprocessor 2 includes a 14-bit analog-to-digital conversion driving circuit for converting an analog signal sent by the sensor circuit 1 into a digital signal. The LCD 4 displays a reading representing the temperature scanned by the voice thermoscan at the eardrum. The EEPROM 3 records corrected digital data derived from signals sent by the sensor circuit 1 for use by the microprocessor 2 to compare to the values of temperature taken by the thermoscan. The communication interface 5 has built-in voice means that includes a voice circuit and a speaker for indicating the scanned temperature by voice.

The voice thermoscan of the present invention functions in following manner. First, the sensor circuit 1 senses an infrared heat at a temperature point on the patient's eardrum and sends a corresponding signal to the microprocessor 2. Then, the microprocessor 2 samples and digitizes signals sent by the sensor circuit 1, compares the digitized signals to the corrected data stored in the EEPROM 3, and performs operations on the data to verify the temperature value of the infrared heat. A result from the comparison and operation is then output to the LCD 4 for display. Meanwhile, the microprocessor 2 also outputs the value of temperature to the communication interface 5.

In addition to the function of operation, the internal microprocessor 2 of the voice thermoscan also has the function of storing three entries to automatically memorize data of temperature before the thermoscan is powered off, so that the stored values may be used as references in the next scan.

Figure 2:
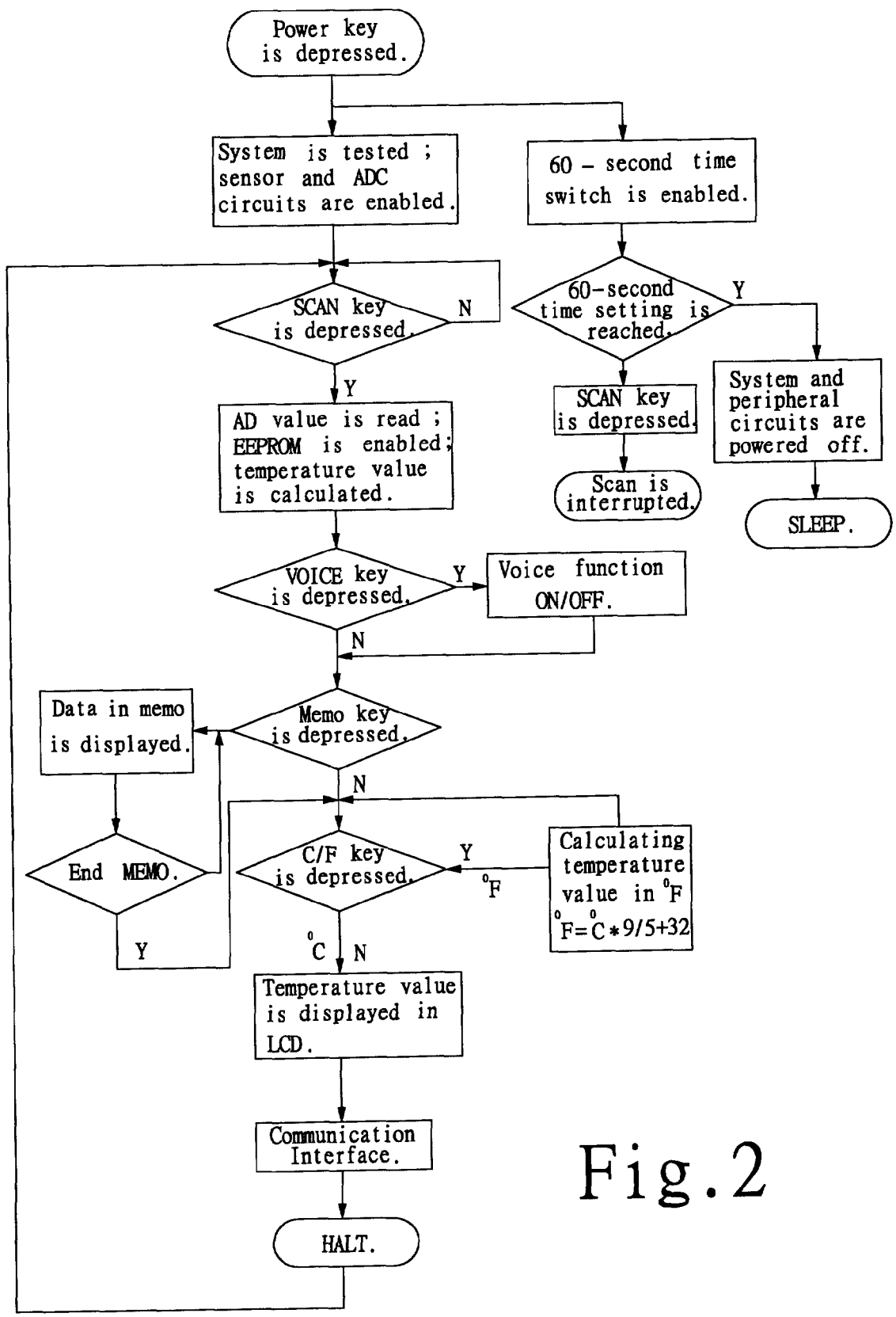
FIG. 2 is a flowchart illustrating operating steps of the present invention.

Moreover, to save power consumption by the voice thermoscan, the microprocessor 2 is provided with a 60-second time switch (as shown in FIG. 2) which will automatically delay for another 60 seconds when the voice thermoscan is in use, in order to ensure a convenient use of the thermoscan by a user. And, the microprocessor 2 is so designed that it can also perform conversion of Fahrenheit degrees from or into Celsius degrees to meet the need of different users.

Figure 3:
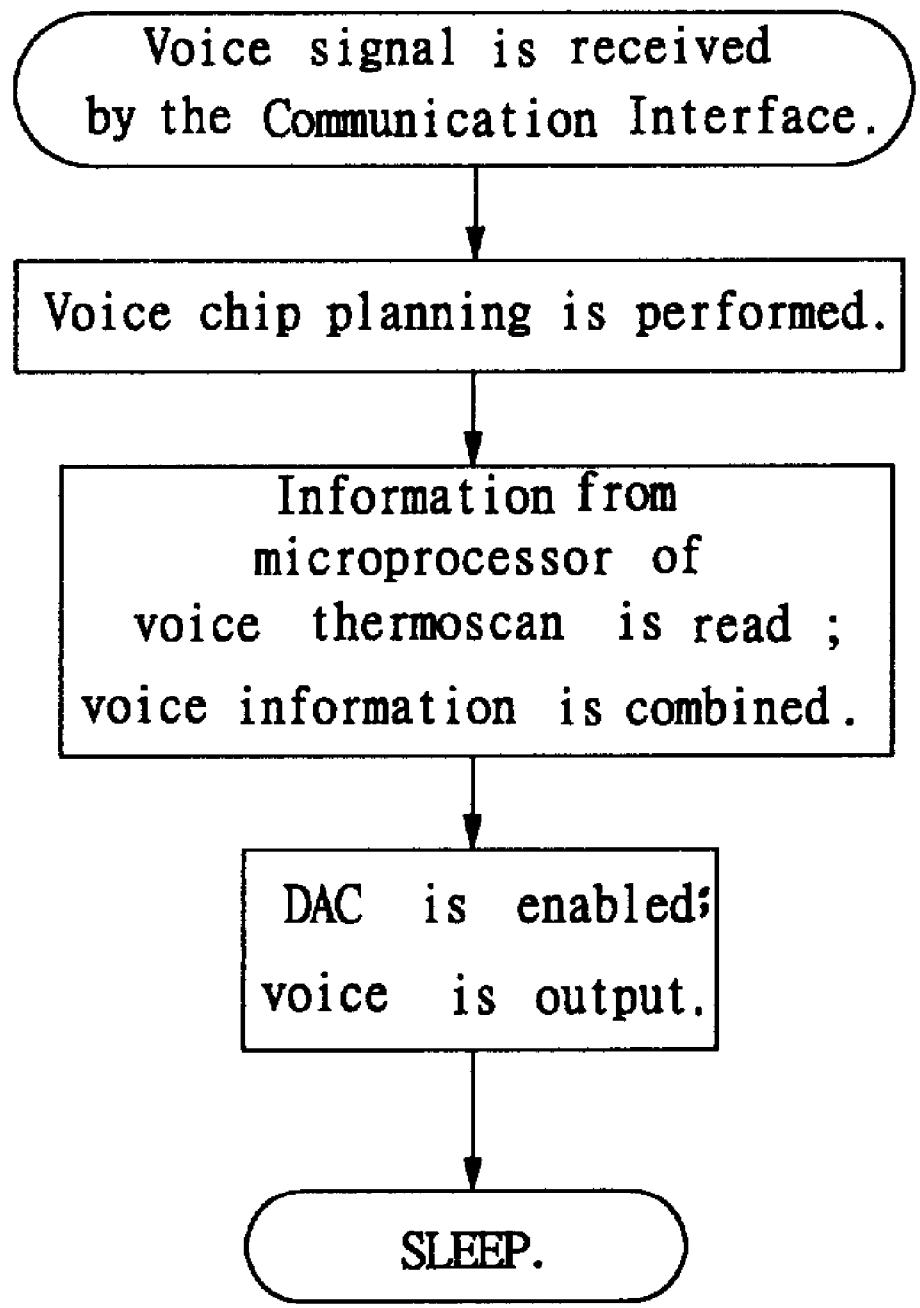
FIG. 3 is another flowchart illustrating operations of the communication interface of the present invention.

FIG. 3 is a flowchart illustrating operations in the communication interface 5 of the present invention. As shown, the communication interface 5 includes voice means to output voice corresponding to a scanned temperature value. The voice means may also be designed to include different musical sounds that separately correspond to a different temperature value scanned by the voice thermoscan. Such musical sounds attract small children and advantageously eliminate the children's fear to facilitate the taking of temperature via ear.

In brief, the voice thermoscan of the present invention has following features and advantages that enable the present invention to be a novel and practical product:

1. The voice function of the thermoscan of the present invention enables the blind to use it without any difficulty.
2. The output of musical sounds by the voice thermoscan attracts small children and eliminates their fear toward the taking of temperature via ear.
3. The 60-second time switch and the automatic time delay function thereof enables effective saving of power consumption by the voice thermoscan while permits convenient use thereof.
4. Temperature value displayed or voiced can be easily converted between Fahrenheit and Celsius degrees to meet the need of different users.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A voice thermoscan comprising a main body, said main body comprising a sensor circuit, a microprocessor, a liquid crystal display, an electronic erasable programmable read-only memory, and a communication interface;

said sensor circuit senses an infrared heat at a temperature point on a patient's eardrum and sends a signal corresponding to a sensed temperature to said microprocessor;

said microprocessor samples and digitizes said signal sent from said sensor circuit, and compares said digitized signal with corrected data stored in said electronic erasable programmable read-only memory to verify a temperature value of said infrared heat, said microprocessor then outputs a result to said liquid crystal display for display, said microprocessor also outputs said result to said communication interface which includes audible signal means that indicate said temperature value by audible means, and said microprocessor further includes a timing means that automatically turns off a power supply of said voice thremorscan after a period of non-use.

* * * * *